United States Patent
Tylka, Sr.

[15] 3,639,040
[45] Feb. 1, 1972

[54] LENS SYSTEM FOR COLOR PHOTOGRAPHY

[72] Inventor: John Tylka, Sr., 1865 N. Curson Ave., Hollywood, Calif. 90046

[22] Filed: July 27, 1970

[21] Appl. No.: 58,541

[52] U.S. Cl. .......................... 350/193, 350/167, 350/195, 350/212, 350/317
[51] Int. Cl. ............................. G02b 5/02, G02b 27/00
[58] Field of Search ............... 350/193, 194, 195, 196, 197, 350/204, 213; 95/12.21

[56] References Cited

UNITED STATES PATENTS

| | | | |
|---|---|---|---|
| 1,921,918 | 8/1933 | Goodwin | 350/213 UX |
| 2,430,121 | 11/1947 | Goodwin | 350/195 UX |
| 2,546,996 | 4/1951 | Garutso | 350/197 |
| 2,591,535 | 4/1952 | Garutso | 350/197 |

Primary Examiner—John K. Corbin
Attorney—J. Calvin Brown

[57] ABSTRACT

The color lens system includes a main objective lens and an annular series of independent color lenses positioned forwardly of the main objective lens; the inner diameter of the annular series of independent color lenses being equal to or slightly greater than the diameter of the main objective lens. Prismatic lenses are provided for each color lens, which lenses collect light rays from the object being photographed and direct the light rays to the color lenses, the rays from the color lenses being directed to the main objective lens. The color rays pass through the main objective lens and the focal length of the main objective controls the focal point of the color rays. The color system uses all colors of the spectrum and results in an improved color balance with resultant flatness of field to the edge of the aperture.

7 Claims, 9 Drawing Figures

3,639,040

INVENTOR,
JOHN TYLKA, Sr

BY
ATTORNEY

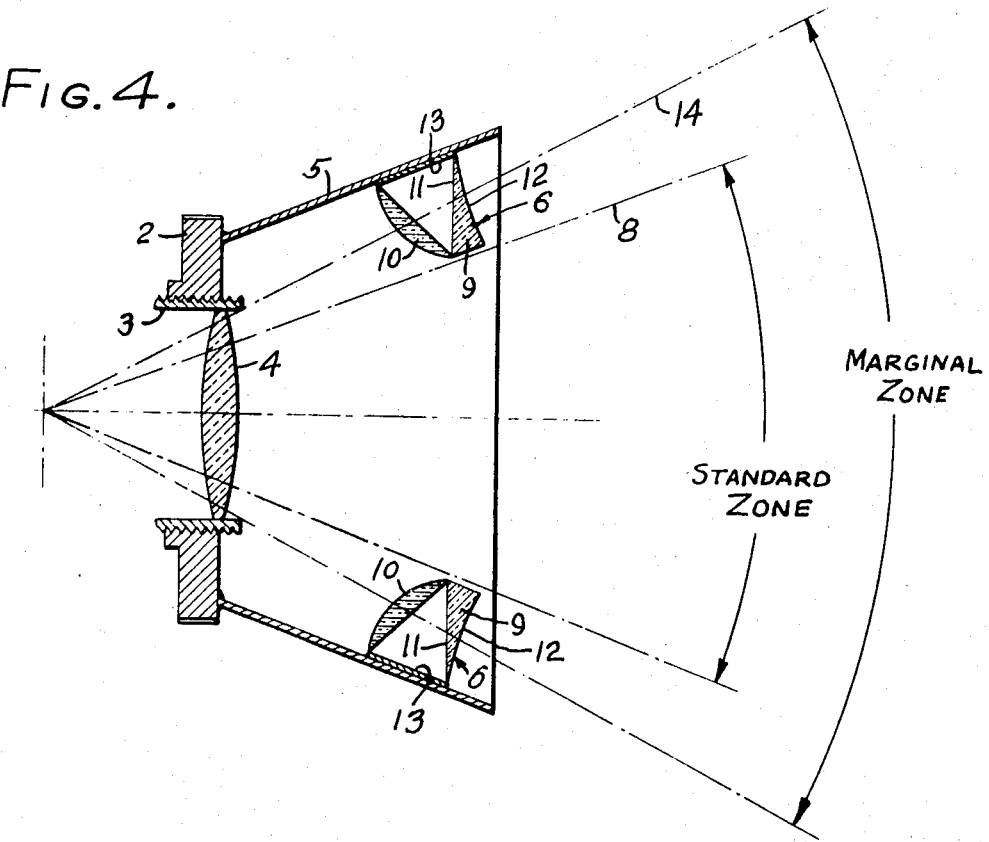
Fig.4.
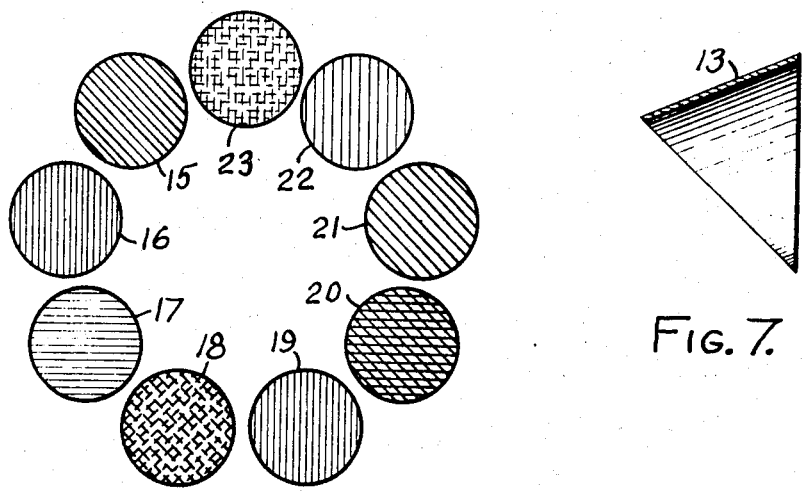
Fig.5.
Fig.7.
INVENTOR,
JOHN TYLKA, Sr

LENS SYSTEM FOR COLOR PHOTOGRAPHY

BACKGROUND OF THE INVENTION

1. Field of the Invention

Numerous systems are now employed in color photography. In most instances color film is used which will take a colored picture without the use of filters of any character. In the majority of cases, the color picture is often hazy and the colors blurred.

2. Description of the Prior Art

So far as the present inventor is aware, there is no prior art adapted to accomplish the same results as that accomplished by the present invention.

Summary of the Invention

The camera used in the practice of the present invention may be any number of standard makes having a fully corrected main objective lens and in this regard I do not designate any particular make of main objective lens as any suitable lens may be used. I provide a frustoconical shield or adapter the small base of which is secured to the front camera panel which panel secures the main objective lens. Within this shield is secured an annular series of lenticular units. Each unit includes a clear optical glass prismatic lens the rear face of which is plane and a planoconvex color lens. The lenticular units are arranged in annular series with the plane face of each color lens and of each prismatic lens in angular relationship. The forward face of the prismatic lens is spherically concave. Light rays from the object being photographed will pass through each lenticular unit and will be directed by the color lens of each unit toward the main objective lens. The main objective lens controls the focal point of the color rays. The color lenses of each lenticular unit are spectrocolors and include green, red and yellow for three of the lenticular units. Other color lenses may be provided such as amber, orange, and pastel colors such as light blue, light red or pink, turquoise, and so on. Thus rays from the object being photographed are refracted through each prismatic lens to the color lens of each lenticular unit and from the color lens the color rays impinge upon the main objective lens and such color hues are transferred to the focal plane of the main objective, the color hues being suffused throughout the entire picture.

An object of the invention is to increase the depth of field in a color picture; to provide flatness of field; to enhance the color of a color film and to cover full aperture without any falloff of color in the film.

Another object is to provide a color system wherein the colors do not bleed and color separation is sharp, and clear in the color picture.

A further object is the provision of a color system for photography which by intensifying colors and color separation allows a larger aperture to be used in the camera and still obtain sharp definition of different objects at a distance as well as those close to the camera.

BRIEF DESCRIPTION OF THE DRAWINGS

FIG. 4, sheet 2, is a longitudinal sectional view of the main objective lens and two lenticular units on an enlarged scale illustrating the path of light rays through the lenticular units and the main objective;

FIG. 5 is a front elevation of the color lenses of the lenticular units taken on the line 5—5 of FIG. 3, and on an enlarged scale;

FIG. 7, sheet 2, is a sectional view of a ring mount for the lenticular units, on an enlarged scale;

DESCRIPTION OF THE PREFERRED EMBODIMENTS

Figure 1:
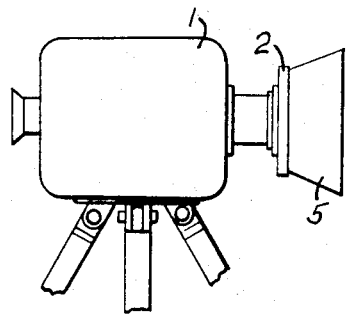
FIG. 1 is a fragmentary side elevation of a camera incorporating the invention.
Figure 2:
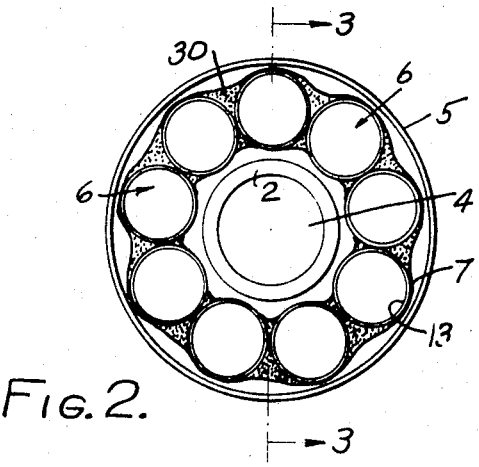
FIG. 2 is a front elevation of the main objective lens of the camera with an annular series of lenticular units surrounding the main objective lens.

A camera of some type is employed, as shown in FIG. 1 at 1, the camera having a panel 2 which supports and receives a lens mount or ring 3. The main objective lens 4 is held within the mount 3 and depending upon the type of camera, the lens mount may be adjustable relative to the panel, as shown in FIG. 4, or held in position by an adjusting means for focusing the main objective lens upon the object to be photographed. Carried by the panel 2 and forwardly of the main objective lens is an adapter 5 constituting a shield of frustoconical form the small base of which is attached to the panel 2 with the larger base extending outwardly as shown in FIG. 4. It will be noted upon examining FIG. 4 that the light ray path is not interferred with in its passage to the main objective lens by the adapter 5. Within the adapter 5 is an annular series of lenticular units designated generally as 6. The lenticular units form an annulus, as shown in FIG. 2 at 7, and the inner diameter of the annulus does not interfere with the light ray zone 8 from the object to be photographed by the main objective lens as shown in FIG. 4. Each lenticular unit includes a prismatic lens 9 and a color lens 10. Each color lens is planoconvex and the prismatic lens has an inner face 11 which is plane and spherically concave outer face 12. The plane faces of the lens and of the prism are in angular relationship and the two elements of each lenticular unit are held in position within the adapter 5 by a mounting tube 13. The prismatic lens 9 is of clear optical glass which may be either crown or flint. The light rays pass through the prismatic lens 9 and are refracted to the color lens 10. The angularity of the plane faces of the prism and the color lens refracts the color light rays to the main objective lens 4, see FIG. 4 for the ray path at 14. Certain of the lenses are of additive primary color and always used, and reference is had to FIG. 5 in which the color lens at 15 is green, 16 is red, and at 17 is blue. There are nine color lenses shown in FIG. 5, lens 18 is orange, 19 is ruby red, 20 blue green, 21 light green, 22 pink and 23 yellow. The additive primaries are used with variations in color hues.

Figure 3:
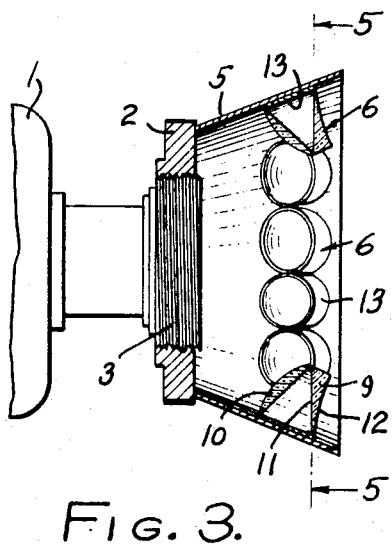
FIG. 3 is a fragmentary sectional view on the line 3—3 of FIG. 2.

As shown in FIGS. 2 and 3 mastic 30 may be employed to hold the lenticular units in annular formation within the adapter 5.

Figure 6:
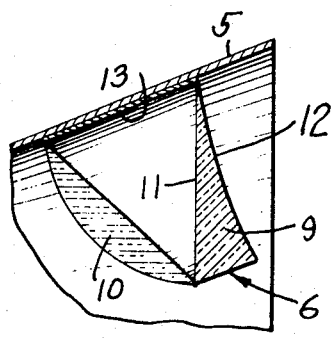
FIG. 6, sheet 1, is a fragmentary sectional view of one of the lenticular units, on an enlarged scale.
Figure 9:
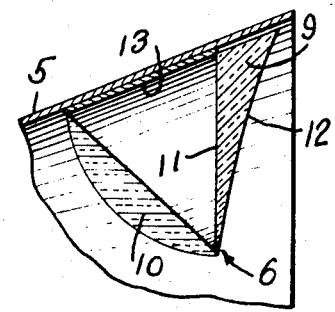
Figure 8:
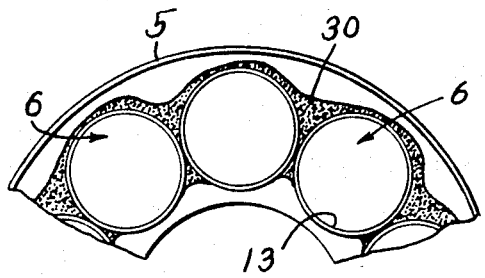
FIG. 8, sheet 1, is a fragmentary enlarged front elevation, looking in the direction of the lenticular units and illustrating a means for holding the lenticular units in position within a shield or adapter; and, FIG. 9 is a fragmentary sectional view, on an enlarged scale, illustrating a different position of one element of a lenticular unit from that shown in FIG. 6.

The prismatic lens of each lenticular unit may be shifted 180° from the showing of FIG. 6 to that of FIG. 9. It will be observed that this shifting does not change the angularity between the plane faces of a prismatic lens and of a color lens. The plane faces of the prismatic lens all lie in the same plane. It has been found that the front face of the prismatic lens by being spherically concave, appreciably gathers light rays and directs the rays to the plane face of each color lens. The color rays from each color lens are passed by the main objective to the focal point of the main objective which suffuses the color hues throughout the entire picture. The color hues enhance the colors imposed on the focal plane. Each lenticular unit and the components thereof; to wit, a color lens and a prismatic lens, have no focal length with the result that the focal length of a color hue is controlled by the main objective lens. This fact permits the main objective to be properly focused on the object being photographed without in any manner disturbing the color rays or hues transmitted to the focal plane of the main objective lens. It is found that the color hues so transmitted by the main objective cover the whole aperture and results in a flatness of field to the very edge of the aperture. When color film is used the present system and means enhances the colors of the film with the result that clear definition and a sharpness in the image results with the objects photographed clearly defined and separated without any bleeding of the colors on the film.

In an experiment conducted the area included within the annulus of the lenticular units was covered, the main objective lens facing the cover to receive only color light rays from the lenticular units. It was found that the lenticular units together with the main objective lens transmitted not only the colors to the focal point of the main objective lens but that the object towards which the lenticular units was directed showed an outline of the subject being photographed in color and without distortion of the image. The camera may be used at full aperture with good results so far as definition and sharpness of image is concerned. Quality objectives for cameras are corrected so that all spectral colors are in focus on the same plane simultaneously. Hence, an objective so corrected will transmit the color rays from the lenticular units to the same photographic plane simultaneously and in focus on the same plane. It should also be mentioned, upon examining FIG. 4 that the field of view of the main objective is not interferred with by the annular series of lenticular units and that light reflected from the object has the image focused by the lens on the photographic plate or film.

It is believed that the operation of the color system and means will be clear from the description as given.

I claim:

1. A lens system for color photography wherein a camera has a main objective lens corrected for all spectral colors whereby said colors are in focus on the same plane simultaneously, the improvement comprising: an annular series of substantially afocal lenticular units positioned forwardly of the main objective, the field of view of said main objective being through said annulus, each lenticular unit having a color lens for receiving the light reflected from the object to be photographed and color light rays from each color lens being directed to the main objective.

2. The lens system as set forth in claim 1, wherein each lenticular unit comprises a clear glass prismatic lens and a planoconvex primary color lens.

3. The lens system as set forth in claim 2, the front face of each prismatic lens facing the object to be photographed, the light rays reflected from the object being passed by each prismatic lens to a color lens, the color light rays from said lens being refracted to the main objective.

4. A lens system for color photography wherein a camera has a main objective corrected so that all spectral colors are in focus on the same plane simultaneously, an annular series of independent substantially afocal units positioned forwardly of and out of the field of view of the main objective, each lenticular unit including a color lens to direct colored light reflected from the object being photographed to said main objective.

5. The lens system set forth in claim 4, characterized in: that each color lens is a primary color.

6. The combination with the main objective of a camera of an annular series of substantially afocal lenticular units positioned forwardly of, and out of the field of view of, the main objective, each lenticular unit comprising a clear prismatic lens and a planoconvex color lens, the front face of each prismatic lens being concave and facing the object to be photographed and the rear face of said prismatic lens being plane, the plane faces of each color lens and the plane faces of each prismatic lens being at an angle whereby light reflected from the object to be photographed is passed through the prismatic lens to the plane face of the planoconvex lens and directed to the main objective, the main objective directing the color rays of light from said color lenses to the focal point of the main objective.

7. The lens system as set forth in claim 6; and a shield surrounding and interposed between the main objective and the annular series of lenticular units.

* * * * *